United States Patent
Unsin

(10) Patent No.: US 6,238,474 B1
(45) Date of Patent: *May 29, 2001

(54) QUICK-SETTING, HYDRAULIC BINDING AGENT

(75) Inventor: Joachim Unsin, Heidelberg (DE)

(73) Assignee: Heidelberger Zement AG, Heidelberg (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/091,421

(22) Filed: Jul. 15, 1993

(30) Foreign Application Priority Data

Jul. 17, 1992 (DE) .................................. 42 23 494

(51) Int. Cl.$^7$ .......................... C04B 14/26; C04B 24/04; C04B 24/18
(52) U.S. Cl. ...................... 106/692; 106/725; 106/728; 106/823
(58) Field of Search .................... 106/692, 693, 106/696, 713, 724, 725, 728, 819, 823

(56) References Cited

U.S. PATENT DOCUMENTS

| | | | |
|---|---|---|---|
| 3,664,854 | * 5/1972 | Kokuta | 106/696 |
| 3,689,294 | * 9/1972 | Braunauer . | |
| 3,748,158 | * 7/1973 | Braniski et al. | 106/692 |
| 3,772,045 | * 11/1973 | Haldas et al. | 106/696 |
| 4,012,264 | * 3/1977 | Murray et al. | 106/696 |
| 4,131,578 | * 12/1978 | Crinkelmeyer et al. | 106/725 |
| 4,168,985 | * 9/1979 | Kolar et al. | 106/725 |
| 5,328,507 | * 7/1994 | Crocker | 106/692 |

FOREIGN PATENT DOCUMENTS

| | | | |
|---|---|---|---|
| 87102228 | * 11/1987 | (CN) . | |
| 254246 | * 1/1988 | (CS) . | |
| 2024379 | * 10/1991 | (ES) . | |
| 0073220 | * 6/1978 | (JP) | 106/696 |

OTHER PUBLICATIONS

*Structure and Performance of Cements,* (1983) Barnes pp. 376–377, and p. 429.*

* cited by examiner

Primary Examiner—Paul Marcantoni
(74) Attorney, Agent, or Firm—Staas & Halsey LLP

(57) ABSTRACT

The present invention concerns a quick-setting, hydraulic binding agent, containing calcium silicate cement, in particular Portland cement, reactive calcium aluminates, in particular high alumina cement, as well as, if required, known additives and/or admixtures, which is characterized by a content of:

a) 0.1 to 2.0% by volume of an organic and/or inorganic accelerator for hydrating the calcium silicates,
b) 0.10 to 2.00% by volume of an organic and/or inorganic setting retarder inhibiting the hydration of the calcium silicates, if required, having a liquefying effect,
c) 0.01 to 0.05% by volume of an organic and/or inorganic setting accelerator for hydrated calcium aluminate, and
d) 0.01 to 0.20% by volume of an inhibitor with respect to formation of the hydrated calcium aluminum sulfates.

7 Claims, 2 Drawing Sheets

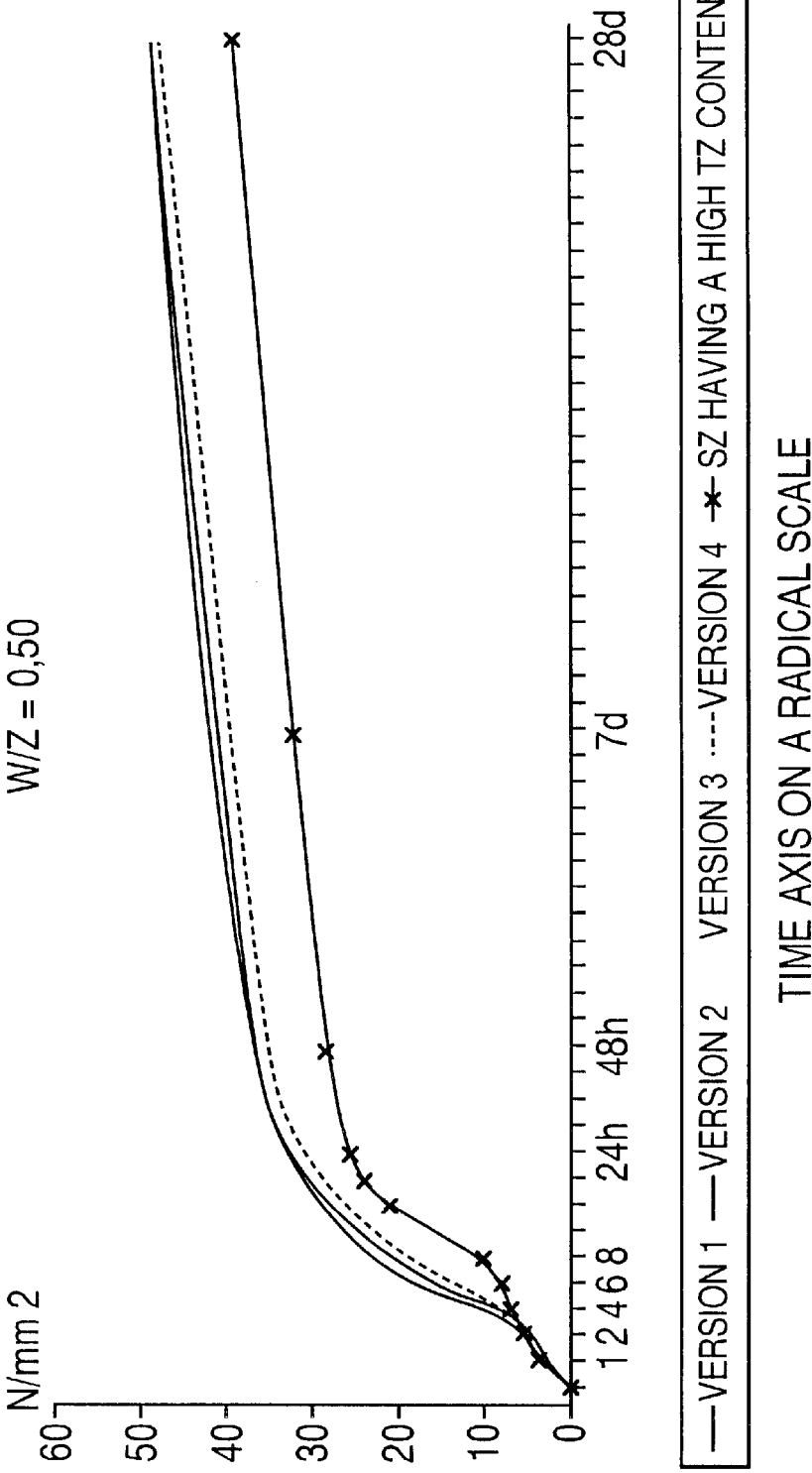

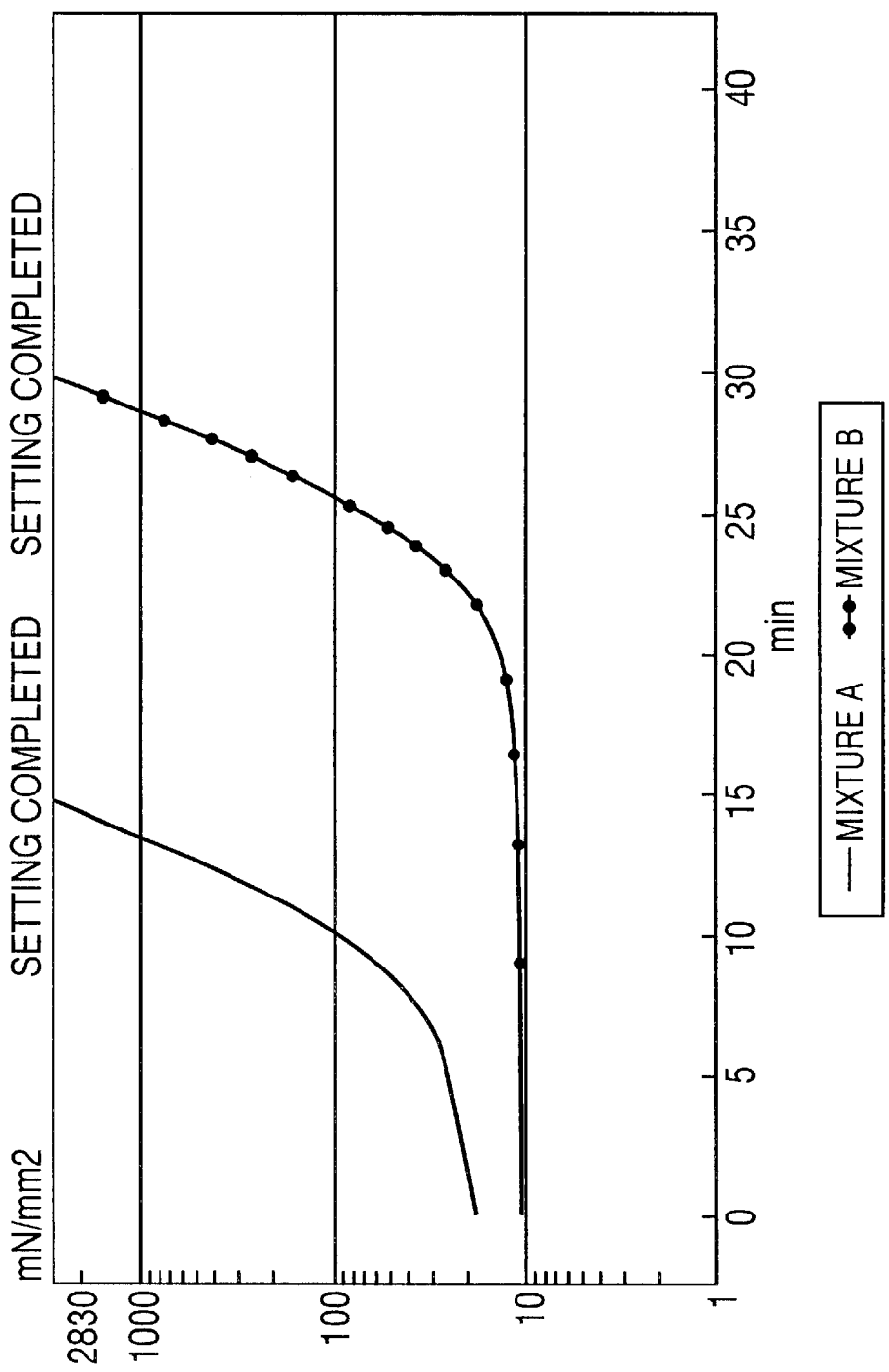

QUICK-SETTING, HYDRAULIC BINDING AGENT

The invention concerns a quick-setting, hydraulic binding agent containing calcium silicate cements, in particular Portland cement, reactive calcium aluminates, in particular high alumina cement, (commonly referred to as aluminous cement) as well as, if required, known additives and/or admixtures within the meaning of the definition according to DIN 1045 and DIN 4226.

Among the additives and added substances are, for example, agents to improve processibility, pore-forming materials, condensers, bond improvers, pigments, sealing compounds and the like. Admixtures for concrete or mortar mixtures made from the quick-setting hydraulic binding agent of the invention can, for example, be stone powder, trass, flue ashes, silica dust and the like.

Numerous compositions are known which contain high alumina cement and Portland cement and which are used as quick-setting mixtures.

The following should be elaborated upon with respect to the prior art:

For example, U.S. Pat. No. 4,012,264 discloses that a cement can be produced which sets and hardens very quickly by mixing Portland cement and high alumina cement, if required, by using various accelerators; in addition, a calcium aluminate and Portland cement composition is described which contains retarders and/or accelerators.

Plaster of Paris or anhydrite gypsum have also already been added to high alumina cement to obtain more solid forms and castings; see e.g. T. D. Robson, High Alumina Cements and Concretes, John Wiley & Sons, N.Y., 1962; it is noted on pages 126–127 of this reference that lithium salts are suitable as accelerators for high alumina cement.

However, it was found that compositions which contain high alumina cement, gypsum and lithium salts as accelerators by themselves show an excessive shrinkage and wet expansion when in a hardened state.

A quick-setting binder mixture is known from European Patent No. 0 228 595 which contains Portland cement clinkers, reactive calcium aluminates and/or high alumina cement, reactive calcium sulfate, an organic setting retarder as well as alkali carbonate.

In this binder mixture, a very steep setting characteristic results after the pot time, with very high early consistencies and high final consistencies.

The disadvantage of this binding agent is in the strict or limited requirements with respect to the choice of primary materials. That is, pulverized Portland cement clinkers are used with the addition of a limited amount of calcium sulfate as a main component instead of commercial Portland cement.

European Patent No. 0 211 362 describes a mixture for producing quick-setting mortar which contains binding agents as well as conventional admixtures and additives. A quick-setting mortar can be produced from this dry mortar mixture by adding mixing water. Said quick-setting mortar is suitable for crack-free filling of breaks in old concrete and for crack-free coating of coarse patches.

European Patent No. 0 211 365 discloses a quick-setting cement which contains reactive calcium silicates and reactive aluminates and which sets very quickly with high early consistency, yet relatively slight final consistency.

In addition, European Patent No. 0 213 390 describes a mortar mixture which contains reactive calcium silicates, reactive aluminates, calcium hydroxide, hydrated calcium sulfate, calcium sulfate anhydrite-II and an organic setting retarder, in addition to the conventional admixtures and additives, whereby an increase in the amount of reactive aluminates results in an improvement in the early and final consistency, a step, however, which leads to a considerable increase in the cost of materials.

Having regard to the content of reactive calcium aluminates or high alumina cement in quick-setting binder mixtures of the present type, the noted patents show that portions of at least 5% by volume, usually considerably higher portions of a model-type high alumina cement with 50% $Al_2O_3$ content, are considered to be indispensable in the trade. While developing the quick-setting binding agent of the invention, it was surprisingly found that a decrease in the content of high alumina cement below this value leads to a clear improvement in the development of compressive strength while only slightly reducing the early consistency.

It is now the object of the present invention to produce a quick-setting, hydraulic binding agent by selecting a specific formularization of the composition which does not have the disadvantages of the above-described, quick-setting binding agents of the prior art while attaining advantages.

This object is solved in a quick-setting, hydraulic binding agent of the above-noted type thereby that the binding agent of the invention is characterized by a content of:

a) 0.1 to 2.0% by volume of an organic and/or inorganic accelerator for hydrating the calcium silicates, b) 0.10 to 2.00% by volume of an organic and/or inorganic setting retarder inhibiting the hydration of the calcium silicates, if required, having a liquefying effect, c) 0.01 to 0.05% by volume of an organic and/or inorganic setting accelerator for hydrated calcium aluminates, and d) 0.01 to 0.20% by volume of an inhibitor with respect to formation of the hydrated calcium aluminum sulfates.

The quick-setting binding agent of the invention is, for example, characterized by the special advantage that it has, when using the smallest possible portions of high alumina cement on the one hand, and commercial Portland cement on the other hand, it has both high early consistency and a high increase in consistency which is typical for Portland cement.

Additional advantages are noted in the following:

The base for the primary materials for producing the quick-setting binding agent of the invention is significantly broader as the demands on the Portland cement and high alumina cement used, which go beyond the usual extent, are not made.

By using calcium silicate cements, in particular Portland cement of various consistency classes, the compressive strength of the quick-setting binding agent of the invention to be attained can be adjusted appropriately to the respective application.

By considerably reducing the content of high alumina cement in the quick-setting binding agent of the invention, a significant decrease in the cost of materials is attained.

While, as experience has shown, conventional quick-setting cements of the Portland cement/high alumina cement-type experience, on contact with air, a clear increase in the setting time already within a few hours after being mixed with water, the quick-setting binding agent of the invention shows a remarkable insensitiveness with respect to this point. As a result of low material and ambient temperatures, the setting time of the quick-setting binding agent of the invention is extended only slightly.

Examples of embodiments or test results, respectively, are shown in the following with reference to diagrams and tables.

EXAMPLE 1 OF THE INVENTION

Four quick-setting binding agents of the Portland cement/high alumina cement system were produced according to the following recipe, which only differ to the extent that four Portland cements from four different manufacturing plants were used:

92.45% by volume Portland cement
4.7 " high alumina cement
0.5 sodium carbonate as silicate accelerator
0.3 sodium sulfate
1.6 calcium hydroxide
0.05 lithium carbonate as accelerator for aluminates
0.20 KNa tartrate as retarder for aluminates
0.20 calcium lignin sulfonate as silicate retarder In Table 1, the compressive strengths and setting times, as well as the degree of expansion, which were determined on standard mortar according to EN 196 at 20° C. having a W/Z value of 0.50, are noted. In addition, the development of the compressive strength up to 48 hours at 5° C. is noted for the quick-setting binding agent—version 1.

For the sake of comparison, the 20° C. values are also noted for a quick-setting binding agent with higher alumina cement content and the following recipe:

COMPARATIVE EXAMPLE NO. 2

Not According to the Invention 78.8% by volume Portland cement
15.0% by volume high alumina cement
2.0 sodium carbonate
1.0 sodium sulfate
3.0 calcium hydroxide
0.05 lithium carbonate
0.05 KNa tartrate
0.10 calcium lignin sulfonate Diagram 1 shows the development of compressive strength of the four quick-setting binding agents with 4.7% high alumina cement and the mixture with 15% high alumina cement in comparison at a W/Z value of 0.50 on standard mortar according to DIN 1164. Table 1 summarizes the relevant values.

Diagram 2 shows the adjustability of the setting time on two binding agents A and B of the invention. The relevant data is noted in Table 2.

The influence of exposure on the setting time is discussed in the following:

The four quick-setting binder versions, low in high alumina cement, were spread out in 3 mm-thin layers for 24 hours, exposed to air at 23° C. room temperature and 45% relative humidity. The setting was tested on glutinous samples having a W/Z value of 0.35 after 1, 2, 8 and 24 hours.

By way of comparison, a conventional (Portland cement/high alumina cement-based) quick-setting cement was tested in the same manner.

Results:

| Quick-setting binder tests | 0 Tests | End of setting in minutes after 24 hours | | | |
|---|---|---|---|---|---|
| | | 1 | 2 | 8 | 24 |
| Version 1 | 7 | 7 | 7 | 6 | 6 |
| Version 2 | 5 | 6 | 5 | 5 | 5 |
| Version 3 | 8 | 7 | 8 | 7 | 6 |
| Version 4 | 12 | 11 | 10 | 11 | 9 |
| Commercial quick-cement based on Portland cement/ high alumina cement | 20 | 42 | 75 | 110 | 165 |

It becomes apparent here that the quick-setting cement of the invention, low in high alumina cement, with 4.7% high alumina cement, experiences almost no change or, to some degree, a slight shortening of the setting as a result of being exposed to air for one day. The conventional Portland cement/high alumina cement-based quick-setting cement, on the other hand, disadvantageously shows a considerable extension of the setting time, quickly setting in, of 20 minutes with fresh cement to almost 3 hours after being exposed for one day.

TABLE 1

(belongs to Diagram 1)
Compressive strengths according to EN 196 of the 4 quick-setting cement versions

| SZ - Version | Quick-setting cement (SZ) version low in high alumina cement (TZ) (4.7%) | | | | Comparative quick-setting cement (SZ) |
|---|---|---|---|---|---|
| | -1- | -2- | -3- | -4- | (15% high alumina cement (TZ)) |
| PZ | TYPE1 | TYPE2 | TYPE3 | TYPE4 | TYPE2 |
| PZ/TZ | 95/5 | 95/5 | 95/5 | 95/5 | 84/16 |
| W/Z | 0.50 | 0.50 | 0.50 | 0.50 | 0.50 |
| Degree of expansion (cm) | 15.4 | 14.2 | 15.0 | 14.3 | |
| Setting (DIN 1164/ Mortar) | | | | | |
| A | 11 min | 14 min | 7 min | 14 min | 15 min |
| E | 13 min | 16 min | 10 min | 17 min | 16 min |
| Compressive strengths in N/mm2 20 C/5 C | | | | | |
| 1 h | 3.0/2.4 | 3.1 | 3.6 | 2.8 | 4.0 |

TABLE 1-continued (belongs to Diagram 1)
Compressive strengths according to EN 196 of the 4 quick-setting cement versions

| SZ - Version | Quick-setting cement (SZ) version low in high alumina cement (TZ) (4.7%) | | | | Comparative quick-setting cement (SZ) |
|---|---|---|---|---|---|
| | -1- | -2- | -3- | -4- | (15% high alumina cement (TZ)) |
| 2 h | 6.0/3.0 | 4.1 | 4.9 | 5.3 | 5.4 |
| 4 h | 9.2/4.5 | 7.5 | 9.3 | 8.1 | 6.8 |
| 6 h | 18.1/7.2 | 15.0 | 16.5 | 12.5 | 7.7 |
| 8 h | 23.9/— | 21.5 | 24.2 | 19.1 | 9.8 |
| 24 h | 33.4/20.6 | 34.0 | 32.2 | 32.1 | 25.7 |
| 2 d | 37.5/36.4 | 37.0 | 37.2 | 35.9 | 27.7 |
| 7 d | 40.6/— | 42.3 | 41.2 | 39.1 | 32.6 |
| 28 d | 48.0/— | 47.9 | 49.8 | 47.0 | 38.6 |

TABLE 2

(belongs to Diagram 2)

| Composition: | % by volume | |
|---|---|---|
| Mixture | A | B |
| Portland cement | 92.45 | 96.26 |
| High alumina cement | 4.7 | 1.9 |
| Sodium carbonate | 0.5 | 0.4 |
| Sodium sulfate | 0.3 | 0.2 |
| Calcium hydroxide | 1.6 | 0.8 |
| Lithium carbonate | 0.05 | 0.02 |
| KNa tartrate | 0.20 | 0.02 |
| Calcium lignin sulfonate | 0.20 | 0.40 |
| Total | 100.00 | 100.00 |

I claim:

1. A quick-setting, hydraulic binding agent, comprising:
   95–5 wt. % of a first binding substance, comprising:
      98.1–99.1 wt .% Portland cement;
      0.5–1.5 wt. % alkali carbonate; and
      0.1–0.4 wt. % of an organic liquefication-facilitating and calcium silicate hydration-inhibiting material; and
   5–95 wt. % of a second binding substance, prepared separately from the first binding substance, comprising:
      92.45 wt. % Portland cement;
      4.7 wt. % aluminous cement;
      0.5 wt. % alkali carbonate;
      0.3 wt. % alkali sulfate;
      1.6 wt. % calcium hydroxide;
      0.05 wt. % of an inorganic setting accelerator for calcium aluminate hydrates;
      0.20 wt. % of an organic calcium aluminate sulfate hydration-inhibiting setting retarder; and
      0.20 wt. % of an organic liquefication-facilitating and calcium silicate hydration-inhibiting and material.

2. A binding agent according to claim 1, wherein a salt of lignin sulfonic acid is used as the organic liquefication-facilitating and calcium silicate hydration-inhibiting material.

3. A binding agent according to claim 2, wherein calcium lignin sulfonate is used as the salt of lignin sulfonic acid.

4. A binding agent according to claim 1, wherein one of a hydroxycarboxylic acid and a water-soluble alkali salt of a hydroxycarboxylic acid is used as the organic calcium aluminate sulfate hydration-inhibiting setting retarder.

5. A binding agent according to claim 4, wherein the hydroxycarboxylic acid is one of tartaric acid and citric acid, and the water-soluble alkali salt is an alkali salt of one of tartaric acid and citric acid.

6. A binding agent as claimed in claim 1, wherein the aluminous cement is one of a sintered aluminous cement and a melted aluminous cement and has an $Al_2O_3$ content of between 40% and 80%.

7. A quick-setting hydraulic binding agent, comprising:
   98.1–99.1 wt. % of Portland cement;
   0.5–1.5 wt. % of alkali carbonate; and
   0.1–0.4 wt. % of an organic liquefication-facilitating and calcium silicate hydration-inhibiting material, the quick-setting hydraulic binding agent containing aluminous cement, the aluminous cement being present in an amount of less than 5 wt. %.

* * * * *